(12) United States Patent
Lee et al.

(10) Patent No.: US 7,537,130 B2
(45) Date of Patent: May 26, 2009

(54) COMBINED SALAD BOWL DRAINER

(76) Inventors: Avia Annemarie Lee, 67 DuBrick Cres, Kitchener, Ontario (CA) N2E 4A7; Anthony Alphanso Lee, 67 DuBrick Cres, Kitchener, Ontario (CA) N2E 4A7

( * ) Notice: Subject to any disclaimer, the term of this patent is extended or adjusted under 35 U.S.C. 154(b) by 633 days.

(21) Appl. No.: 11/107,678

(22) Filed: Apr. 18, 2005

(65) Prior Publication Data

US 2006/0231554 A1 Oct. 19, 2006

(51) Int. Cl.
*B65D 6/00* (2006.01)
*B65D 43/14* (2006.01)
*B67D 5/06* (2006.01)

(52) U.S. Cl. .................. 220/4.22; 222/543; 220/837
(58) Field of Classification Search ............. 220/4.22, 220/4.25, 4.23, 4.24, 4.34, 4.31, 4.06, 836, 220/837, 375; 99/410, 508, 409, 413; 222/543; 16/271, 265, 327
See application file for complete search history.

(56) References Cited

U.S. PATENT DOCUMENTS

| 4,321,756 | A | * | 3/1982 | Mosely | 34/322 |
| 2004/0112821 | A1 | * | 6/2004 | Hutzler | 210/238 |
| 2006/0070944 | A1 | * | 4/2006 | Ahn et al. | 210/470 |

* cited by examiner

*Primary Examiner*—Anthony D Stashick
*Assistant Examiner*—Shawn M Braden
(74) *Attorney, Agent, or Firm*—Borden Ladner Gervais LLP; Jeffrey W. Wong

(57) ABSTRACT

A food-cooking apparatus having a bowl and a drainer configured to be substantially the same size for stacking one of the bowl and the drainer within the other, and attaching means for movably attaching the drainer and the bowl to one another to move from a retaining position wherein one of the drainer and the bowl is stacked within the other to a flipping position wherein the drainer and the bowl are facing each other, and the rims of the bowl and the drainer are sealingly compressed against each other.

1 Claim, 2 Drawing Sheets

COMBINED SALAD BOWL DRAINER

FIELD OF THE INVENTION

The present invention relates generally to cooking apparatuses. More particularly, the present invention relates to a cooking apparatus used for retaining and washing foods such as pasta, fruits and vegetables.

BACKGROUND OF INVENTION

The use of bowls and drainers to retain, rinse and drain foods like pasta, fruits and vegetables is very common. Typically, a bowl is used to retain the food either before or after washing, and a drainer is used to drain the water from the food after the food has been washed. The steps required for washing the food usually are (1) pour water into the bowl containing the food, (2) clean the food in the bowl with the water, (3) transfer the food from the bowl to the drainer either by manually handling the food or by manually lifting the bowl and tilting it over the drainer to drop the food into the drainer, (4) allow the food to sit in the drainer until the water is drained out, and (5) transfer the food back into the bowl either by manually handling the food or by manually lifting the drainer and tilting it over the bowl to drop the food back into the bowl.

The use of a separate bowl and a separate drainer to retain and wash the food as described above is not ideal, it would be burdensome and time consuming for the user (the cook) to manually handle the food to transfer them from the bowl to the drainer and from the drainer back to the bowl, as discussed in steps (3) and (5) above, if the cook chooses the more convenient and time-efficient way of transferring the food from one of the bowl and drainer to the other by tilting the one containing the food over the other, he might spill some of the food being dropped into the drainer or bowl or, even worse, he might drop the bowl or drainer while lifting and tilting it.

Therefore, it can be appreciated that there exists a need for a food-cooking apparatus, which can be used for retaining and washing food in a convenient and easy way that is not prone to accidents. The present invention substantially fulfills this need.

SUMMARY OF INVENTION

To overcome the deficiencies of the prior art described above, the present invention accordingly provides a food-cooking apparatus having a bowl and a drainer configured to be substantially the same size for stacking one of the bowl and the drainer within the other, and attachment apparatus, or means, for movably attaching the drainer and the bowl to one another to move from a retaining position wherein one of the drainer and the bowl is stacked within the other to a flipping position wherein the drainer and the bowl are facing each other.

Preferably, the bowl and the drainer are shaped as a segment of a sphere. The bowl can have two bowl studs adjacent its rim and diametrically opposed from one another, and the drainer can have two drainer studs adjacent its rim and diametrically opposed from one another. Where this is the case, the attaching means can be two members each comprising an elongated aperture for receiving and maintaining one of the bowl studs and one of the drainer studs, whereby the bowl stud and the drainer stud can slide within the aperture.

The present invention provides the advantage of allowing a user to wash foods such as pasta, fruits and vegetables in a convenient and time-efficient way without the risk of spilling any or all of the food being washed.

Other advantages of the present invention will become apparent to those ordinarily skilled in the art upon reading and understanding the description of the preferred embodiment which follows.

BRIEF DESCRIPTION OF THE DRAWINGS

Embodiments of the present invention will now be described, by way of example only, with reference to the attached Figures, wherein.

DETAILED DESCRIPTION

Figure 1:
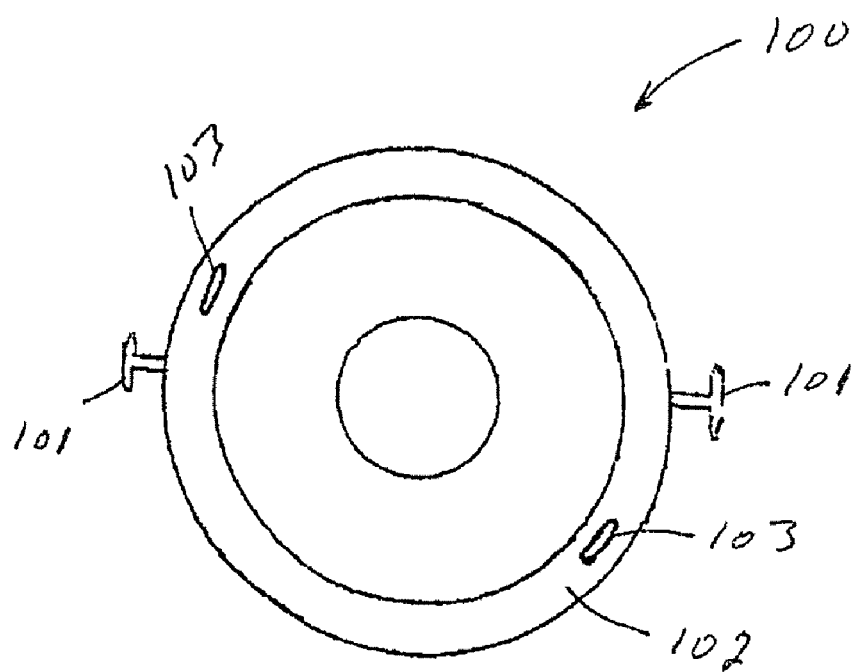
FIG. 1 is a top view of a bowl according to an embodiment of the invention.
Figure 2:
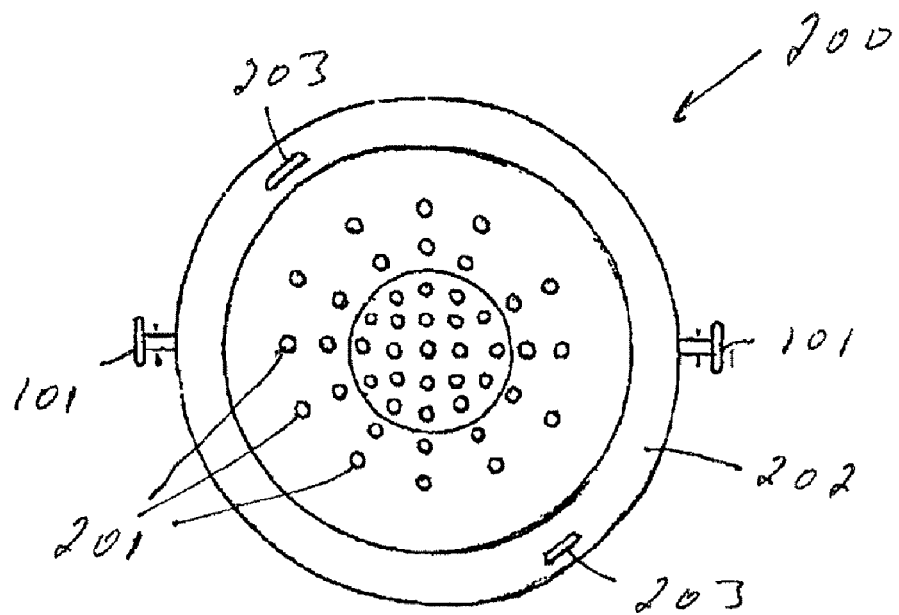
FIG. 2 is a top view of a drainer according to an embodiment of the invention.

Reference will now be made in detail to the preferred embodiments of the invention, examples of which are illustrated in the accompanying drawings. The present invention provides an apparatus for retaining and rinsing food. Generally, the apparatus is a combination of a retaining bowl and a drainer. FIGS. 1 and 2 show a bowl 100 and a drainer 200 according to one embodiment of the invention. The bowl 100 and drainer 200 are preferably of a spherical shape: they can be shaped as a semi-sphere or any other segment of a sphere. The bowl has two diametrically opposed studs 101 adjacent to its inturned rim 102 and two diametrically opposed tongues 103 on the inturned rim 102 projecting substantially away from the bottom of the bowl 100. The drainer 200 also has two diametrically opposed studs 101 adjacent to its inturned rim 202 and two diametrically opposed grooves 203 in the inturned rim 202. In addition, the drainer, of course, has drain holes 201, which are usually symmetrically arranged. When the drainer 200 is stacked within the bowl 100, the tongues 103 engage the grooves 203 to lock the drainer against any rotational movement relative to the bowl.

It should become obvious to a person of skill in the art after reading the description of the invention that the tongues and grooves could be reversed so that the rim of the bowl would have grooves in it and the rim of the drainer would have tongues. As such, the bowl can be stacked on top of the drainer in a similar manner to the one described above. Other locking means for locking one of the bowl and drainer against rotational movement relative to the other when stacked should also be obvious to a skilled person.

Figure 3:
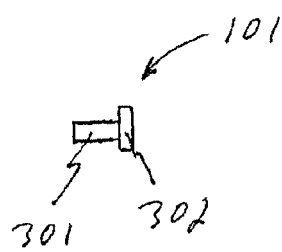
FIG. 3 is an enlarged side view of a stud of the bowl of FIG. 1 or the drainer of FIG. 2.
Figure 4:
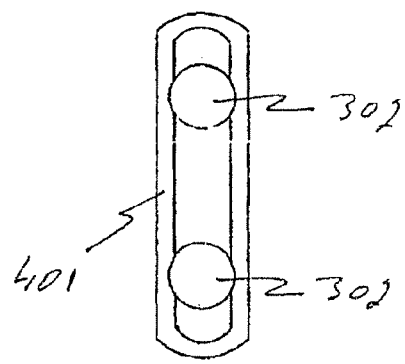
FIG. 4 is a side view of an attachment strip according to an embodiment of the invention.

FIG. 3 shows in an enlarged view a stud 101 of the bowl of FIG. 1 or the drainer of FIG. 2, which has a rod member 301 and a circular disc 302 mounted at the end of the rod member 301. FIG. 4 shows an attaching strip 401 for attaching the bowl 100 and drainer 200 to one another. The strip 401 has an elongated aperture in it for receiving and maintaining one of the studs of the bowl 100 and one of the studs of the drainer 200. The width of the aperture is greater than the diameter of the rod members 301 to allow the studs 101 to slide within the strip 401, but are smaller than the diameter of the discs 302 to allow the strip 401 to maintain the studs 101 once received. The strip 401 could be made of resilient deformable plastic that can be deformed to receive the studs 101 (or the discs 302 thereof), and then maintains the studs 101 when returned to its normal undeformable condition. Other attachment apparatus, or means, for movably attaching the bowl 100 and the drainer 200 to one another should be obvious to those skilled in the art.

Figure 5:
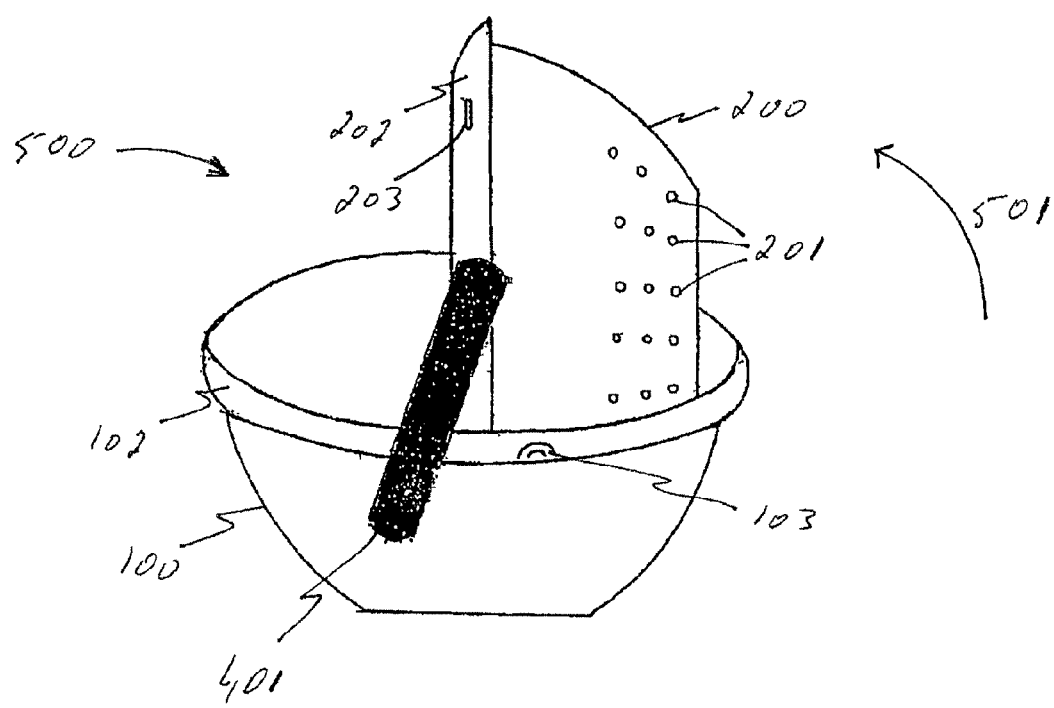
FIG. 5 is a side view of an embodiment of the invention showing the bowl of FIG. 1 and the drainer of FIG. 2 movably attached by the attachment strip of FIG. 4, the drainer being moved halfway between the retaining position and the flipping position.

Reference is now made to FIG. 5 to illustrate the operation of the invention. Although suitable for many types of foods such as pasta, fruits and vegetables, for simplicity, the operation of the invention will be described with fruits in mind. As described above, the drainer 200 can be stacked within the bowl 100 and locked against rotational movement in the stacked position. In this position, the apparatus can be used for retaining the fruits. When one desires to wash (rinse) the fruits, one can do so by going through the following step:

1. Fill the bowl 100 with water. The bowl 100 can be filled with water with the drainer 200 being stacked within it or, alternatively, the bowl 100 can be stacked within the drainer 200, as explained above, and filled with water. FIG. 5 is in line with the first arrangement. Accordingly, the following steps will also be in line with the option of having the drainer 200 stacked within the bowl 100.
2. Wash the fruits while they are being soaked in the water.
3. Lift the drainer 200 vertically upward and move it in the direction of arrow 501 until the rims 102 and 202 of the drainer 200 and the bowl 100 are facing each other (i.e., the planes of the two rims are parallel to each other). By doing so, the fruits will drop from the drainer 200 into the bowl 100. Of course, if the bowl 100 was stacked on top of and within the drainer 200, the fruits would already be in the bowl 100, and the user would have to lift the bowl 100 vertically upward and move the drainer 200 from below the bowl 100 in the direction of arrow 501.
4. Align the rims 102 and 202 of the drainer 200 and the bowl 100 with one another and press them against each other. As shown in FIG. 5, the tongues 103 and the complimentary grooves 203 are positioned to the side of the inturned rims 102 and 202, respectively.
5. Flip the apparatus 500 over a sink to allow the fruits and water to fall from the bowl 100 into the drainer 200 and allow the water be drained out of the drainer 200 through drain holes 201.
6. After all of the water has drained out, lift the inverted bowl 100 vertically upward (disengaging the two rims 102 and 202), and move it in a similar manner as the one described above in step (3) so the drainer 200 is stacked again within the bowl 100 for maintaining the washed fruits within it.

The above description and accompanying drawings are presented to enable any person skilled in the art to make use of the invention and is provided in the context of a particular application and its requirements. Various modifications to the disclosed embodiments, will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The appended claims, properly construed, form the only limitation upon the scope of the invention.

The invention claimed is:

1. A food-cooking apparatus comprising:
a bowl and a drainer configured to be substantially the same size for stacking one of the bowl and the drainer within the other; and
attachment apparatus for movably attaching the drainer and the bowl to one another to move from a retaining position wherein one of the drainer and the bowl is stacked within the other to a flipping position wherein the drainer and the bowl are facing each other;
the bowl comprises two bowl studs adjacent the rim of the bowl and diametrically opposed from one another;
the drainer comprises two drainer studs adjacent the rim of the drainer and diametrically opposed from one another; and
the attachment apparatus is two members each comprising an elongated aperture for receiving and maintaining one of the bowl studs and one of the drainer studs, whereby the bowl stud and the drainer stud can slide within the aperture; and
wherein the bowl and the drainer are shaped as a segment of a sphere.

* * * * *